(12) United States Patent
Tone

(10) Patent No.: US 6,462,837 B1
(45) Date of Patent: Oct. 8, 2002

(54) GRAY-SCALE CONVERSION BASED ON SIMD PROCESSOR

(75) Inventor: Takeharu Tone, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/262,317

(22) Filed: Mar. 4, 1999

(30) Foreign Application Priority Data

Mar. 5, 1998 (JP) .......................................... 10-071383

(51) Int. Cl.[7] ................................................ H04N 1/46
(52) U.S. Cl. ...................................... 358/3.01; 358/3.21
(58) Field of Search ........................ 358/1.9, 519, 455, 358/3.01, 3.21; 382/254, 168–169

(56) References Cited

U.S. PATENT DOCUMENTS 4,468,693 A * 8/1984 Fujita et al. ................. 358/523
6,188,454 B1 * 2/2001 Greene et al. ............... 345/589

* cited by examiner

Primary Examiner—Thomas D Lee
Assistant Examiner—Stephen Brinich
(74) Attorney, Agent, or Firm—Oblon, Spivak, McClelland, Maier & Neustadt, P.C.

(57) ABSTRACT

An image processing device for performing gray-scale conversion includes a plurality of processing elements which include respective registers and perform the gray-scale conversion in parallel with respect to respective pixels based on data stored in the respective registers. The image processing device further includes a control unit which controls the processing elements such that the registers of a given one of the processing elements store data of a line segment which is selected from a series of line segments representing an input-to-output relation of the gray-scale conversion, the line segment being selected to correspond to an input gray-scale level of a corresponding pixel.

19 Claims, 13 Drawing Sheets

FIG. 5

$$OUTPUT = int \{a_n \cdot (INPUT - X_n) + Y_n\}$$

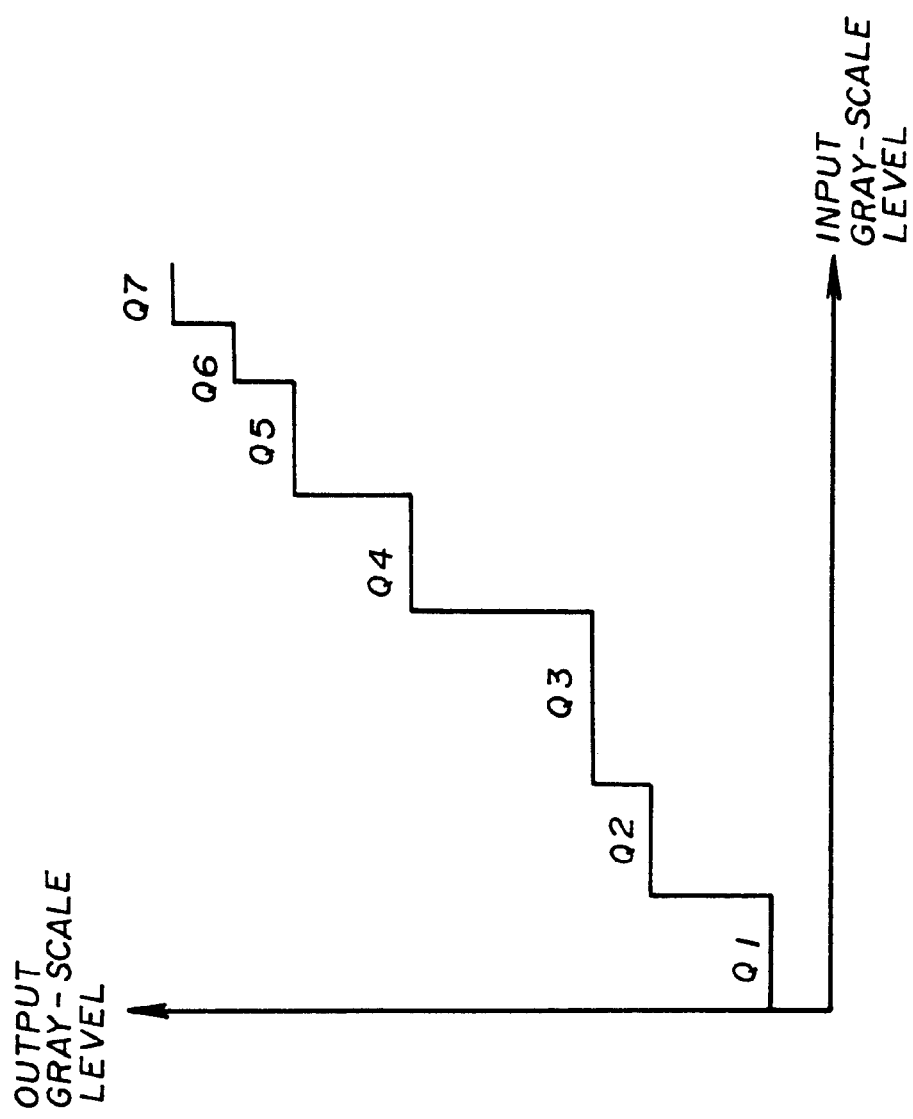

Yule-Nielsen $$D = n \log_{10} \frac{1}{1 - A(1 - 10^{-D_s/n})}$$

GRAY-SCALE CONVERSION BASED ON SIMD PROCESSOR

BACKGROUND OF THE INVENTION

1. Field of the Invention

The present invention generally relates to image processing devices such as copiers, FAX machines, printers, etc., for processing image signals, and particularly relates to an image processing device which attends to gray-scale conversion such as gamma correction.

2. Description of the Related Art

An image processing device such as a copier machine scans a document sheet placed on the contact glass, and performs opto-electrical conversion on each scanned line. The obtained image signal is converted into a digital signal, which is then subjected to image processing to generate a recording signal. The image processing device uses this recording signal to modulate laser light emitted form a laser device, thereby forming a latent image on a photo-sensitive body. This latent image corresponds to the original document image.

The image processing performed during the above operation includes such processes as color correction, gamma correction, shading correction, MTF correction, gray-scale correction, size enlargement/reduction process, etc.

Conventional image-processing devices conduct gamma correction by using a look-up table stored in a memory. Namely, a look-up table, which lists output levels corresponding to input levels over the entire gray-scale range, is stored in an external memory, and an input address representing an input level is supplied to read a corresponding output level from the memory. An input-to-output relation between the input levels and the output levels can be drawn as a characteristic curve on a graph, which is generally referred to as a gamma curve.

The memory may need to store more than one look-up table, i.e., more than one relations between input levels and the output levels. Such a plurality of gamma curves may become necessary when the copier machine is provided with a function to select a desired image density from a plurality of image density levels for printing images, for example. This adds to memory space required for storing the look-up tables.

In some configurations where an image memory is shared by different devices, separate gamma corrections may become necessary for the scanner and for the printer, for example. This also adds to the memory space for the look-up tables. Also, when there is a need to change gamma curves, all the entries in the look-up tables have to be rewritten.

In this manner, the scheme which stores gamma curves as look-up tables requires a relatively large memory space, and lacks flexibility in changing gamma curves Accordingly, there is a need for an image processing device which can reduce a data size required for gamma correction, and allows the gamma curves to be easily modified.

In image processing, generally, an SIMD (single instruction and multiple data) processor can save a lot of computation time by providing pixel-wise parallel operations. It is quite natural to expect that the SIMD processor would be quite effective in gray-scale conversion such as gamma correction since the gray-scale conversion is a pixel-wise parallel process in nature. Only a simple operation, however, can be performed by each processing element of the SIMD processor, and an algorithm for the SIMD processor to calculate gray-scale conversion has yet to be developed.

Accordingly, there is a need for an image processing device which uses an SIMD processor to perform gray-scale conversion.

SUMMARY OF THE INVENTION

Accordingly, it is a general object of the present invention to provide an image processing device which can satisfy the need described above.

It is another and more specific object of the present invention to provide an image processing device which can reduce the data size necessary for gamma correction, and allows the gamma curves to be easily modified.

It is another and more specific object of the present invention to provide an image processing device which uses an SIMD processor to perform gray-scale conversion.

In order to achieve the above objects, an image processing device for performing gray-scale conversion includes a plurality of processing elements which include respective registers and perform the gray-scale conversion in parallel with respect to respective pixels based on data stored in the respective registers, and further includes a control unit which controls the processing elements such that the registers of a given one of the processing elements store data of a line segment which is selected from a series of line segments representing an input-to-output relation of the gray-scale conversion, the line segment being selected to correspond to an input gray-scale level of a corresponding pixel.

The image processing device described above uses data of the series of line segments to represent the input-to-output relation of the gray-scale conversion, thereby reducing the data size necessary for the gray-scale conversion such as gamma correction in comparison to when a look-up table is used. Also, a gamma curve can be easily modified by changing the data of the series line segments. Further, a line segment pertinent to a given pixel is selected, and a corresponding processing element operates based on the data of the pertinent line segment. This configuration allows the processing elements to operate in parallel in accordance with the same instructions while attending to calculation directed to different line segments.

According to another aspect of the present invention, the image processing device described above further includes a program memory unit which stores programs for causing the control unit to control the processing elements.

According to another aspect of the present invention, the image processing device described above further includes a memory unit which stores data of the series of line segments representing the input-to-output relation of the gray-scale conversion, wherein the control unit transfers the data of the line segment to the registers of the given one of the processing elements.

According to another aspect of the present invention, the image processing device described above is such that the data of the series of line segments includes a position of a start point of each of the line segments and a slope of each of the line segments, and each of the processing elements includes an operation unit which performs an operation specified by the control unit and a flag which stores a value indicative of a result of the operation, wherein the control unit controls the operation unit to make a comparison between the position of the start point and the input gray-scale level of a corresponding pixel successively with respect to each of the line segments so that the flag indicates whether a line segment is already selected for a corresponding one of the processing elements.

According to another aspect of the present invention, the image processing device described above is such that the gray-scale conversion comprises gamma correction, and the series of line segments represent a gamma curve of the gamma correction.

According to another aspect of the present invention, the image processing device described above further includes a scanning unit which scans a document image, and produces a scanned image signal, and an image-formation unit which prints the document image on a sheet of paper in accordance with a processed image signal, which is obtained by applying the gray-scale conversion to the scanned image signal.

According to another aspect of the present invention, a method of performing gray-scale conversion by controlling a plurality of processing elements operating in parallel with respect to respective pixels includes the steps of a) representing an input-to-output relation of the gray-scale conversion by a series of line segments, b) selecting a line segment from the series of line segments with respect to each of the processing elements so that the line segment selected for a given one of the line segments corresponds to an input gray-scale level of a corresponding pixel, and c) controlling the processing elements in parallel to perform the gray-scale conversion, each of the processing elements operating based on data of the selected line segment.

The method described above uses data of the series of line segments to represent the input-to-output relation of the gray-scale conversion, thereby reducing the data size necessary for the gray-scale conversion such as gamma correction in comparison to when a look-up table is used. Also, a gamma curve can be easily modified by changing the data of the series line segments. Further, a line segment pertinent to a given pixel is selected, and a corresponding processing element operates based on the data of the pertinent line segment. This configuration allows the processing elements to operate in parallel in accordance with the same instructions while attending to calculation directed to different line segments.

According to another aspect of the present invention, the method described above is such that the step a) includes a step of storing data of each of the line segments in a memory unit, and the step b) includes a step of storing the data of the selected line segment in registers of a respective one of the processing elements.

According to another aspect of the present invention, the method described above is such that the step a) includes a step of storing data of each of the line segments in a memory unit, the data including a position of a start point and a slope of each of the line segments, and the step b) include the steps of successively selecting one of the line segments in an order of the series, making a comparison between the position of a start point of the successively selected one of the line segments and an input gray-scale level of a pixel of a given processing element, and storing the data of the successively selected one of the line segments in registers of the given processing element unless the comparison indicates that the data of the line segment corresponding to the input gray-scale level of the pixel of the given processing element has been stored in the registers of the given processing element.

According to another aspect of the present invention, the method described above is such that the gray-scale conversion comprises gamma correction, and the series of line segments represent a gamma curve of the gamma correction.

According to another aspect of the present invention, the method described above further includes the steps of scanning a document image to produce a scanned image signal, and printing the document image on a sheet of paper in accordance with a processed image signal, which is obtained by applying the gray-scale conversion to the scanned image signal.

Other objects and further features of the present invention will be apparent from the following detailed description when read in conjunction with the accompanying drawings.

BRIEF DESCRIPTION OF THE DRAWINGS

FIG. 5 is a drawing showing a conversion formulae for gamma conversion;

FIG. 12 is an illustrative drawing showing an input-to-output relation of a quantization process.

DESCRIPTION OF THE PREFERRED EMBODIMENTS

In the following, embodiments of the present invention will be described with reference to the accompanying drawings.

Figure 1:
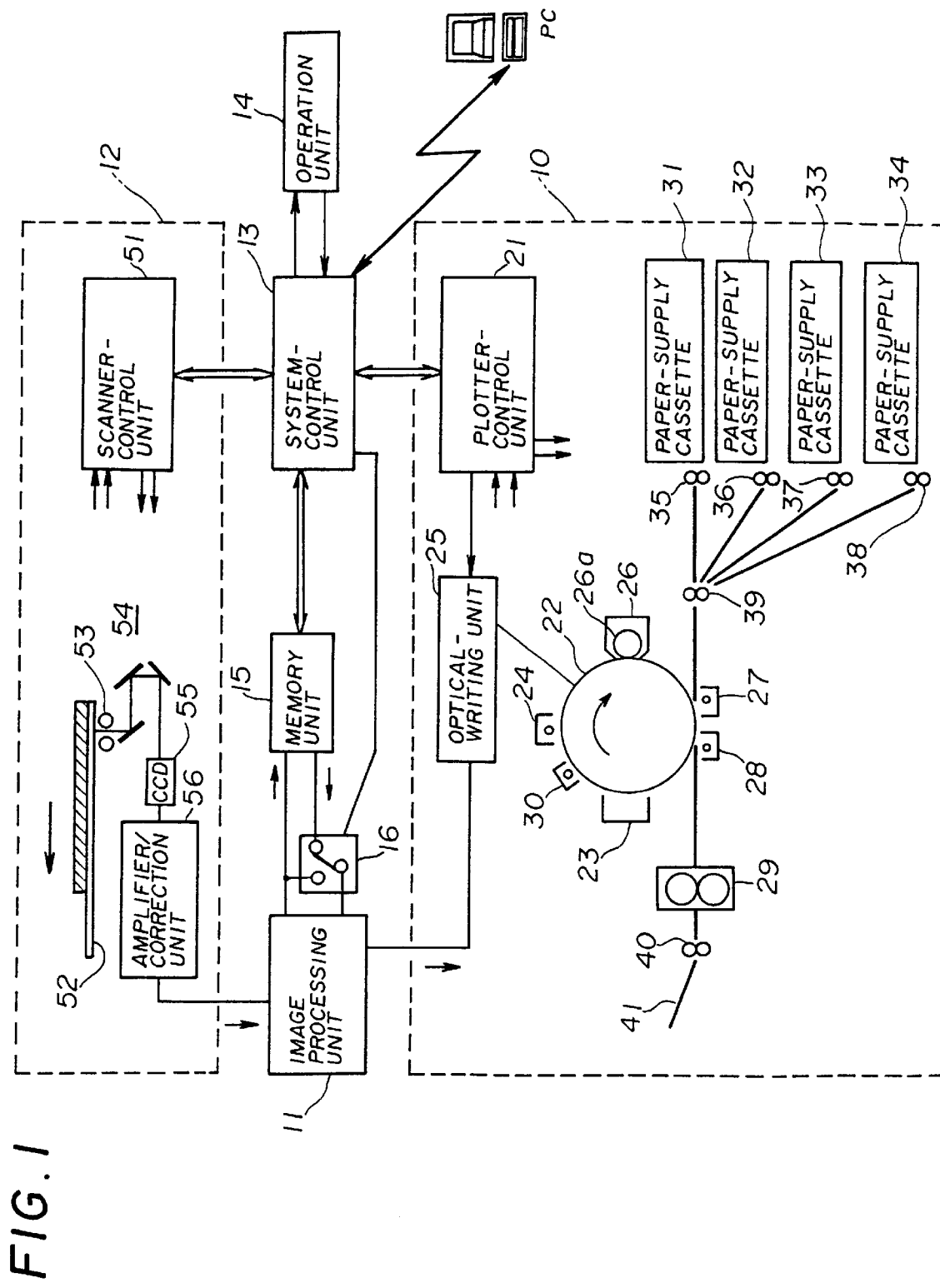
FIG. 1 is an illustrative drawing showing a configuration of an image processing device according to an embodiment of the present invention.

FIG. 1 is an illustrative drawing showing a configuration of an image processing device according to an embodiment of the present invention. In this example, the image processing device is a copier machine.

The image processing device of FIG. 1 includes an image-formation unit 10, an image processing unit 11, a scanning unit 12, a system-control unit 13, an operation unit 14, a memory unit 15, and a selector unit 16.

The image-formation unit 10 includes a plotter-control unit 21, a photosensitive drum 22, a cleaner 23, an electric-charge unit 24, an optical writing unit 25, a development unit 26, a transfer charger 27, a separation charger 28, a fixation unit 29, a discharge unit 30, paper-supply cassettes 31–34, conveyor rollers 35–38, resist rollers 39, a paper-ejection rollers 40, and a paper-ejection tray 41.

The plotter-control unit 21 operates under the control of the system-control unit 13, and attends to control of overall operations of the image-formation unit 10.

The photosensitive drum 22 includes photosensitive material on a surface thereof. The electric-charge unit 24 electrically charges the photosensitive drum 22 to a predetermined voltage level. The optical-writing unit 25 operates under the control of the plotter-control unit 21, and scans a laser beam on the surface of the photosensitive drum 22. The development unit 26 develops an electrostatic latent image formed on the photosensitive drum 22 so as to create a toner image. The transfer charger 27 helps to transfer the toner image from the surface of the photosensitive drum 22 to a sheet of paper when the sheet of paper comes between the photosensitive drum 22 and the transfer charger 27. The separation charger 28 helps to separate the sheet of paper from the photosensitive drum 22. The fixation unit 29 includes a pressure exerting roller and a heat applying roller to fix the toner image on the sheet of paper.

The paper-supply cassettes 31–34 supply sheets of paper, and may be detachable from the image processing device. The conveyor rollers 35–38, the resist rollers 39, and the paper-ejection rollers 40 convey a paper sheet along a paper-sheet path. The paper-ejection tray 41 receives paper sheets as they are ejected by the fixation unit 29.

The scanning unit 12 includes a scanner-control unit 51, a document tray 52, scan lamps 53, mirrors 54, a CCD camera 55, and an amplifier/correction unit 56.

The scanner-control unit 51 operates under the control of the system-control unit 13, and controls overall operations of the scanning unit 12.

A document sheet is placed on the document tray 52 to be scanned by light as the scan lamps 53 emit the light. Light reflected by the document sheet is directed to the CCD camera 55 via an arrangement of the mirrors 54. The CCD camera 55 converts the optical image into an image signal. The image signal is then supplied to the amplifier/correction unit 56, which attends to amplification, analog-to-digital conversion, and shading correction of the image signal.

The image processing unit 11 performs image processing on the image signal supplied from the scanning unit 12, and supplies the processed image signal to the image-formation unit 10. The image processing unit 11 operates based on programs stored in the memory unit 15. The system-control unit 13 may write, change, and delete the programs stored in the memory unit 15.

The operation unit 14 allows a user to access the system-control unit 13 to operate the image processing device. A personal computer PC may be connected to the system-control unit 13 so as to conduct two-way communication therewith and to control the operation of the image processing device.

The photosensitive drum 22 of the image-formation unit 10 rotates in a direction shown by an arrow upon a start of an operation for printing the processed image signal, and is charged up to a predetermined voltage level by the electric-charge unit 24. The optical-writing unit 25 emits a laser beam modulated in accordance with the processed image signal under the control of the plotter-control unit 21, and scans the laser beam on the photosensitive drum 22 electrically charged at the predetermined voltage level. This creates an electrostatic latent image on the photosensitive drum 22. In association with the rotation of the photosensitive drum 22, the development unit 26 creates a thin layer of toner on a development roller 26a, and selectively applies the toner to the electrostatic latent image on the photosensitive drum 22. This develops the electrostatic latent image, and create a toner image on the photosensitive drum 22.

Upon a start of this operation to create the toner image on the photosensitive drum 22, one of the paper-supply roller 35–38 starts rotating, so that a sheet of paper is taken out from one of the paper-supply cassettes 31–34. This paper sheet is conveyed along the paper-sheet path, and makes a temporal stop when a front end of the paper sheet touches the resist rollers 39. The resist rollers 39 resume the conveyer operation when a front end of the toner image on the photosensitive drum 22 reaches a predetermined position. The transfer charger 27 transfers the toner image from the photosensitive drum 22 to the paper sheet.

The paper sheet having the toner image thereon is separated from the photosensitive drum 22 by the separation charger 28, and is supplied to the fixation unit 29. The fixation unit 29 applies heat to the toner image while pressure is applied, thereby fixing the toner image on the paper sheet. The paper sheet is ejected by the paper-ejection rollers 40, and is stacked on the paper-ejection tray 41.

Figure 2:
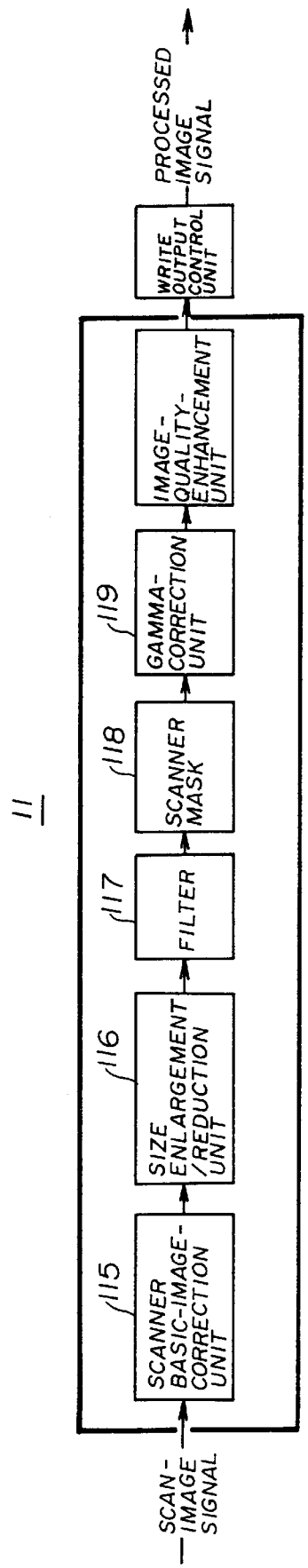
FIG. 2 is a block drawing showing a configuration of an image processing unit shown in FIG. 1.

FIG. 2 is an illustrative drawing showing a configuration of the image processing unit 11.

The image processing unit 11 includes a scanner-basic-image-correction unit 115, a size-enlargement/reduction unit 116, a filter 117, a scanner mask 118, a gamma-correction unit 119, an image-quality-enhancement unit 120, and a write-output control unit 121. The scanner-basic-image-correction unit 115 performs such processes as color correction, shading correction, MTF correction, gray-scale conversion, etc. The size-enlargement/reduction unit 116 attends to size enlargement/reduction of an image. The filter 117 serves to apply a filter operation, and the scanner mask 118 is used for masking operations. The gamma-correction unit 119 applies gamma correction to remove device-specific characteristics of the scanning unit 12 and the image-formation unit 10. The image-quality-enhancement unit 120 attends to image processing for improving image quality. The write-output control unit 121 controls outputting of a processed image signal to the image-formation unit 10.

Various programs for processing images as described above are stored in the memory unit 15 of FIG. 1.

Figure 3:
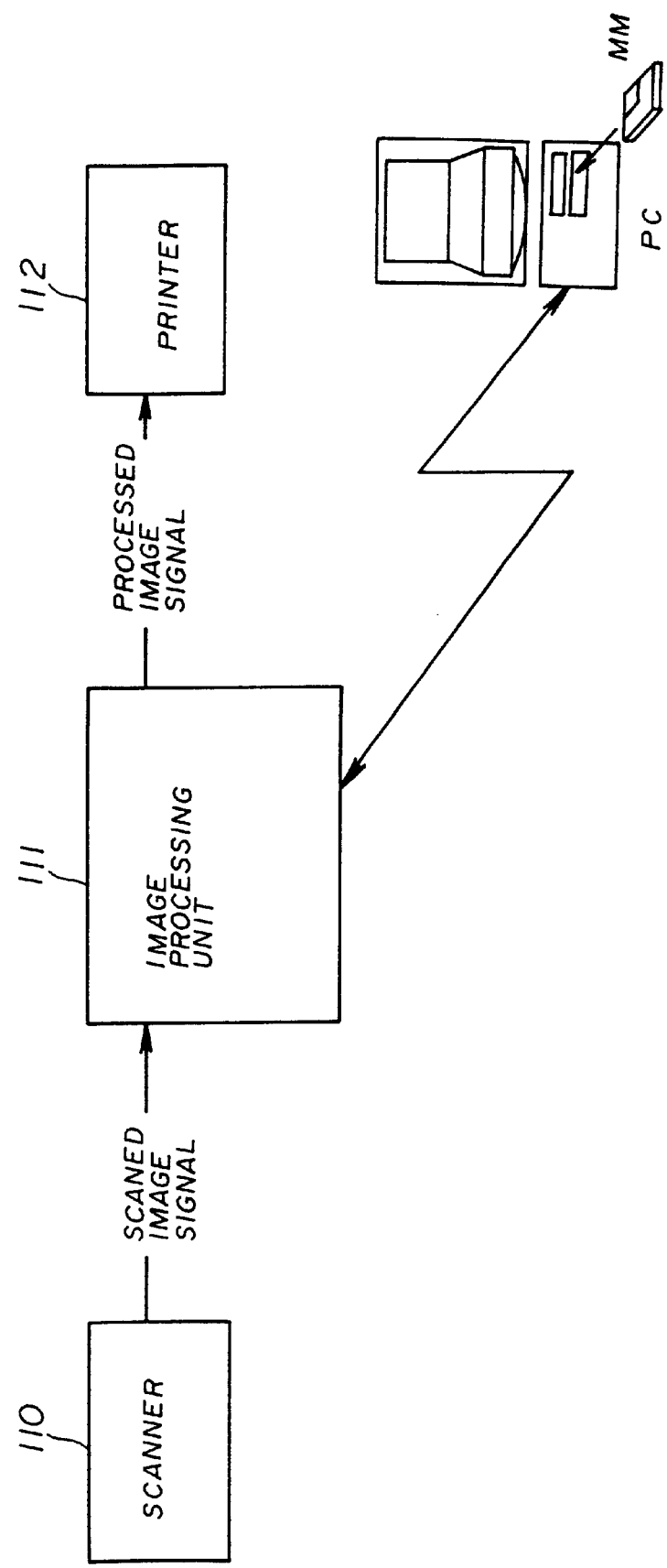
FIG. 3 is a schematic diagram of another embodiment of an image processing device according to the present invention.

FIG. 3 is a schematic diagram of another embodiment of an image processing device according to the present invention.

The image processing device of FIG. 3 includes a scanner 110, an image processing unit 111, a printer 112, and a personal computer PC.

When the image processing device of FIG. 3 operates as a digital copier, for example, the scanner 110 scans a document sheet placed on the contact glass, and performs opto-electrical conversion on each scanned line. The obtained image signal is converted into a digital signal, which is then subjected to image processing by the image processing unit 111 to generate a processed image signal. The processed image signal is supplied to the printer 112. The printer 112 uses the processed image signal to modulate laser light of a laser device and to form a latent image on a photo-sensitive body. This latent image corresponds to the original document image, and is transferred to a sheet of paper to form a permanent image on the sheet of paper.

The image processing unit 111 is controlled by the personal computer PC, which is connected to the image processing unit 111 to conduct a two-way communication therewith. The image processing unit 111 basically has the same configuration as that of image processing unit 11 shown in FIG. 2.

Programs for processing images in the image processing unit 111 may be provided in the form of memory medium MM. The programs recorded in the memory medium MM is loaded into the memory of the personal computer PC to control the operation of the image processing unit 111.

The image processing unit of FIG. 2 (the image processing unit 11 of FIG. 1 or the image processing unit 111 of FIG. 3) is comprised of an SIMD processor. In image processing, the SIMD processor applies the same processing specified by the same instruction to a plurality of pixels simultaneously so as to effect parallel processing of an image.

In the present invention, a gray-scale conversion such as a gamma correction is performed by an SIMD processor.

In the following, an algorithm for an SIMD to perform a gray-scale conversion will be described in detail with reference to a specific example in which a gamma correction is applied to an image.

Figure 4:
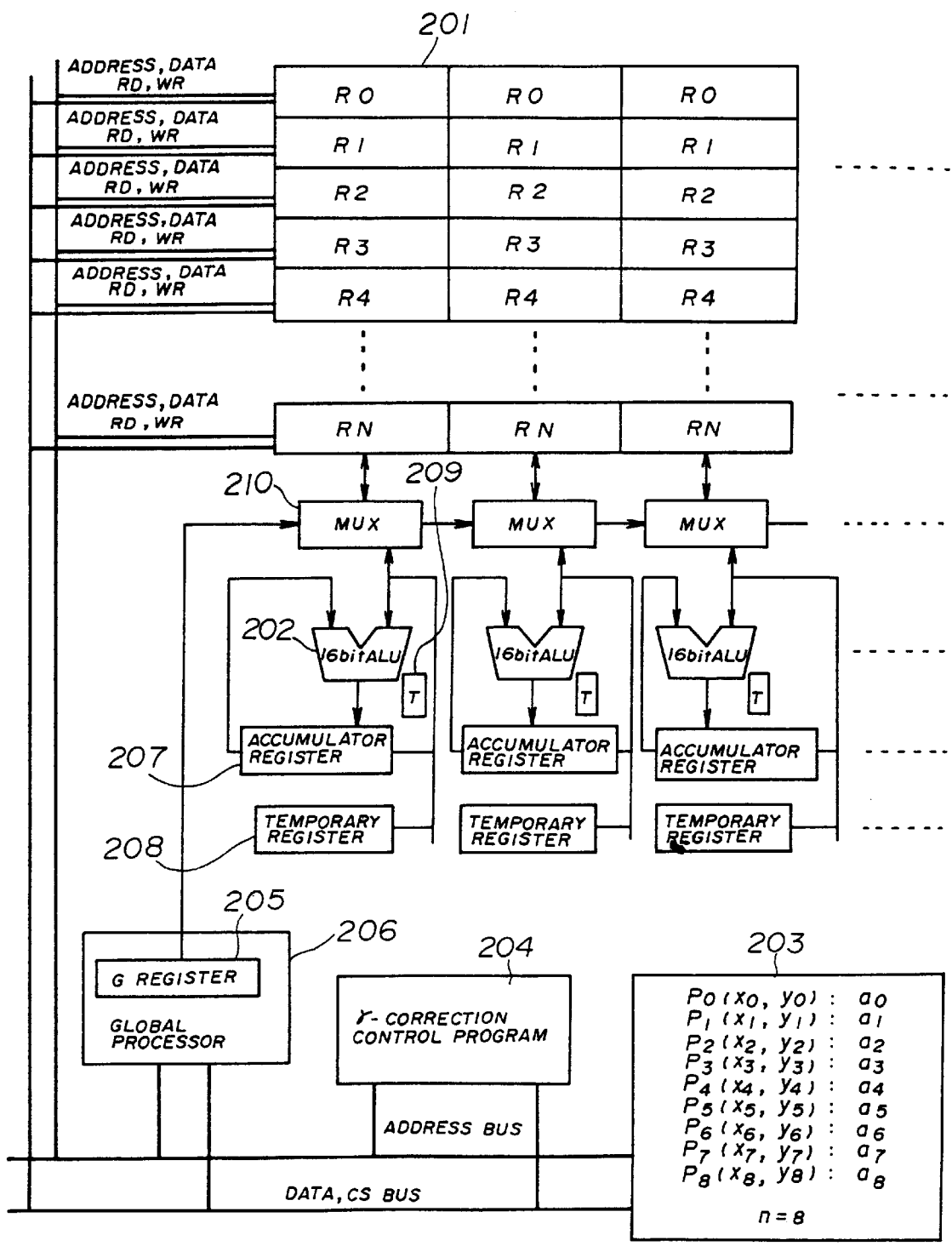
FIG. 4 is an illustrative drawing showing a configuration of a SIMD processor which is used for a gamma correction of an image.

FIG. 4 is an illustrative drawing showing a configuration of a SIMD processor which is used for a gamma correction of an image. In what follows, the SIMD processor of FIG. 4 is referred to as a gamma-correctin device for the sake of convenience.

The gamma-correction device of FIG. 4 includes a plurality of registers 201, a plurality of ALUs (arithmetic/logic operation unit) 202, an external data RAM 203, a program RAM 204, a global register 205, a global processor 206, a plurality of accumulator registers 207, a plurality of temporary registers 208, a plurality of T registers 209, and a plurality of multiplexers 210. The registers 201 includes a set of a R0 register through a RN register for each image pixel to be processed. Also, the ALUs 202, the accumulator registers 207, the temporary registers 208, the T registers 209, and the multiplexers 210 are provided one each for a corresponding one of the image pixels to be processed.

Each of the registers 201 stores 8-bit data, which may be part of image data supplied from an external source, and may be supplied as output data to an external destination. Each of the multiplexers 210 selects either one of data from the global register 205 or data from one of the R0 through RN registers 201, and supplies the selected data to a corresponding one of the ALUs 202. Each of the ALUs 202 applies a specified arithmetic or logic operation to the data supplied from the multiplexer 210 and data supplied from the accumulator register 207. Here, a 16-bit operation is performed.

The external data RAM 203 is actually not part of the SIMD processor, but is connected thereto to provide parameters necessary for calculation of gamma correction. The program RAM 204 stores a program for controlling the operation of the SIMD processor to perform gamma correction. The global processor 206 controls an operation of each ALU 202 based on the same instruction so that all the ALUs 202 perform the same operation at the same time. The global register 205 is provided in the global processor 206, and stores data which is shared by the all ALUs 202.

Each of the ALUs 202 is provided with a corresponding one of the accumulator registers 207 which stores 16-bit data and with a corresponding one of the temporary registers 208 which also stores 16-bit data. Each of the ALUs 202 applies a specified operation to the data supplied from one of the R0 through RN registers 201 and the data supplied from the accumulator register 207, and stores resulting data in the accumulator register 207. A corresponding one of the T registers 209 stores one bit data indicating whether the specified program operation is performed. The multiplexers 210 are also connected in series to output the resulting data to an external destination in a serial manner.

An ALU 202, an accumulator register 207, a temporary register 208, a T register 209, a multiplexer 210, and a set of R0 through RN registers 201 together form a processing element PE. A plurality of processing elements PE are arranged in parallel, and operates in the same manner according to the same program. Each processing element PE attends to data processing of one pixel. The processing elements PE of the SIMD processor may together process data of one raster line of an image in this embodiment.

The R0 through R4 registers 201 store input gray-scale data, x-coordinate data, y-coordinate data, coefficient data (slope data), and output gray-scale data, respectively, and the RN registers (segment registers) 201 store segment data. Details of these data will be described in the following.

Figure 5:
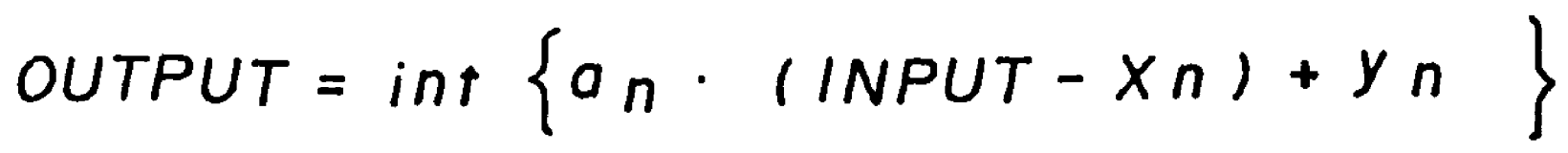

FIG. 5 is a drawing showing a conversion formulae for gamma conversion.

In the present embodiment, an output gray-scale level is calculated from an input gray-scale level by using a linear conversion formulae as shown in the following. Namely, the gamma curve for converting input to output is divided into a plurality of segments of the input gray-scale levels, and a linear expression is used for approximating for the gamma curve within each segment.

Figure 6:
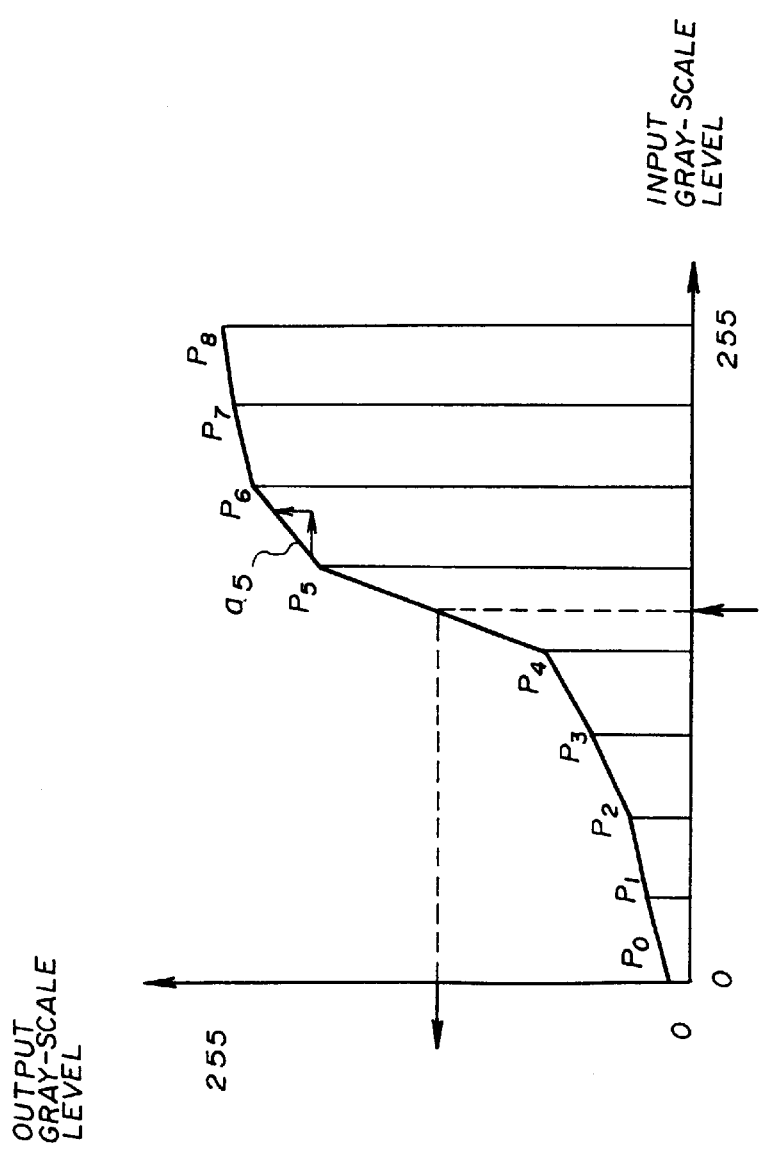
FIG. 6A is an illustrative drawing showing an example of a gamma curve for converting input gray-scale levels to output gray-scale levels.
FIG. 6B is an illustrative drawing showing coordinate data and slope data which represent the gamma curve of FIG. 6A.

FIG. 6A is an illustrative drawing showing an example of a gamma curve for converting input gray-scale levels to output gray-scale levels. FIG. 6B is an illustrative drawing showing coordinate data and coefficient data (slope data) which represent the gamma curve of FIG. 6A.

As shown in FIGS. 6A and 6B, a start point of a n-th segment has a coordinate $P_n(x_n, y_n)$, and a corresponding line segment approximating for the gamma curve has a slope $a_n$. It should be noted that the slope $a_n$ is obtained as $(y_{n+1}-y_n)/(x_{n+1}-x_n)$. In this case, an output value of the gamma conversion is represented as:

$$\text{Output}=a_n \cdot (\text{Input}-x_n)+y_n$$

If the output is quantized into 245 gray-scale levels, the output gray-scale level is obtained as:

$$int\{a_n \cdot (\text{Input}-x_n)+y_n\}$$

where "int$\{\cdot\}$" represents a rounding operation to round a real value to the nearest integer smaller than the real value.

In the following, an algorithm for the SIMD processor to calculate the gamma correction will be described.

In order to use the segment-wise linear approximation as described above, an algorithm should be devised to allow each processing element PE to calculate a linear approximation of a corresponding segment. As previously described, a processing element PE is assigned to each pixel. Since each pixel has a gray-scale level of its own, each processing element needs to calculate a linear approximation for a selected segment, which is likely to be different from processing element to processing element.

Figure 7:
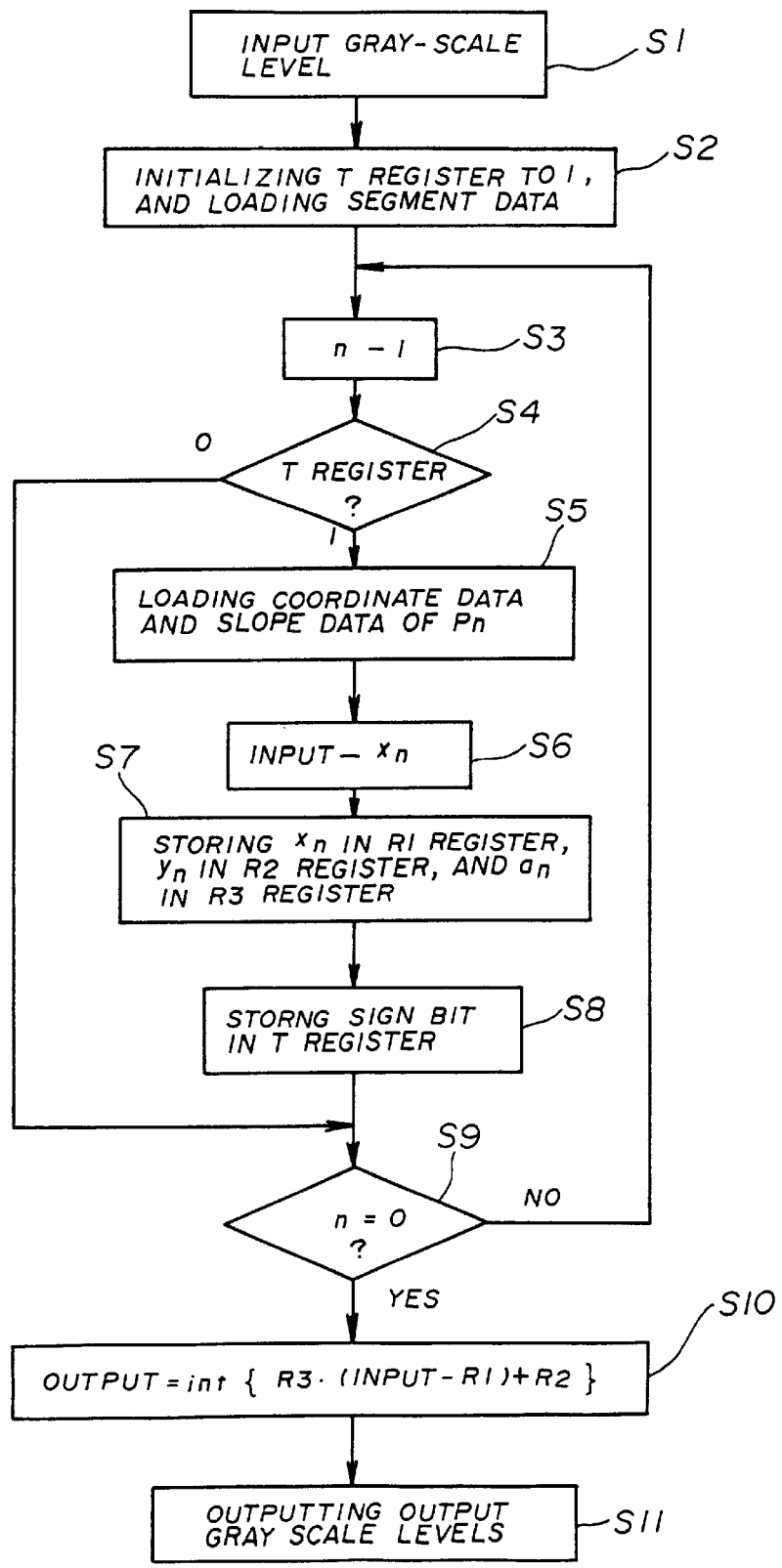
FIG. 7 is a flowchart of a process of calculating a gamma conversion.

FIG. 7 is a flowchart of a process of calculating a gamma conversion. The process of calculating a gamma conversion will be described with reference to FIG. 4 and FIG. 7.

At a step S1, input gray-scale levels are stored in the R0 registers.

At a step S2, the T registers 209 are initialized to store "1". At the same time, segment data is loaded from the external data RAM 203 to the RN registers (segment registers). Here, the segment data indicates the number of segments into which the input gray-scale levels are divided. Namely, if the gamma curve is divided into 8 segments, the segment data is 8. Each of the T registers 209 is a one-bit register, and an ALU 202 performs a specified operation only when a corresponding T register 209 stores "1".

At a step S3, the number n stored in the segment register (RN register) is decreased by 1 (i.e., n=n-1). As mentioned in the above, the segment registers initially store the total number of segments. This number is decreased by 1 each time the following operation is to be performed.

At a step S4, a check is made as to whether the value stored in the T register 209 of a given processing element PE is 1. If the value is 1, the procedure goes to a step S5 for this particular processing element PE. Otherwise, the procedure goes to a step S9 for this particular processing element PE. That is, the following operation from the step S5 to a step S8 is performed only with respect to the processing elements PE that have the T registers 209 storing the value "1".

At the step S5, the x-coordinate data $x_n$ and the y-coordinate data $y_n$ of the point $P_n$ are loaded. Further, the slope $a_n$ is loaded in the global register 205. Transfer of data is carried out via the global register 205.

At a step S6, the ALU of each pertinent processing element PE subtracts the x coordinate $x_n$ from the input gray-scale level stored in the R0 register.

At a step S7, the x-coordinate data $x_n$ and the y-coordinate data $y_n$ of the point $P_n$ are transferred to the R1 register and the R2 register, respectively, of each pertinent processing element PE. Further, the slope an is transferred to the R3 register of each pertinent processing element PE.

At a step S8, a sign bit obtained as a result of the subtraction operation is stored in the T register 209 with respect to each pertinent processing element PE. The sign bit becomes 1 when the result of the subtraction operation is negative (i.e., less than zero). Namely, a given T register 209 stores 1 when the input gray-scale level of a corresponding pixel is smaller than the x coordinate $x_n$ of the currently processed segment. In other words, the given T register 209 stores 1 when the input gray-scale level of the corresponding pixel falls within a segment for which the coordinate data and the slope data has yet to be loaded.

At the step S9, a check is made as to whether the number n stored in the segment register is zero. If it is zero, the procedure goes to a step S10. Otherwise, the procedure goes back to the step S3 to repeat the steps S3 through S8 for the next segment.

At the step S10, the output gray-scale level is calculated via int{R3·(Input−R1)+R2}. Here, R1 through R3 denote the contents of the R1 through R3 registers, respectively. Since the R1 through R3 registers of a given processing element PE store the coordinate data and the slope data of a pertinent segment selected for a corresponding input gray-scale level, the above calculation achieves a proper segment-wise linear approximation.

At a step S18, the output gray-scale levels are output. This ends the procedure.

In the following, details of the operation described above will be illustrated by using the accompanying drawings.

Figure 8:
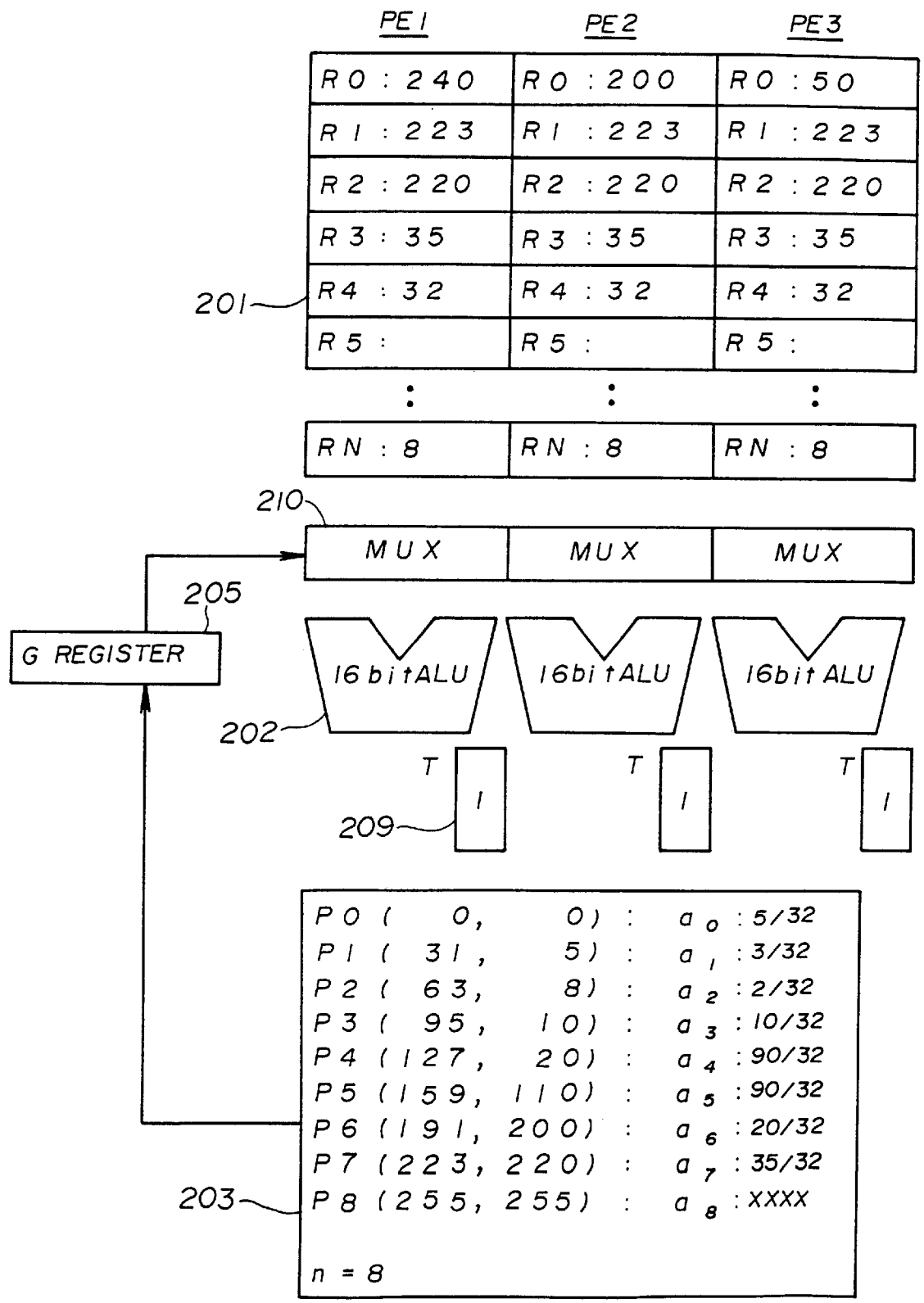
FIG. 8 is an illustrative drawing showing initial conditions of registers.
Figure 9:
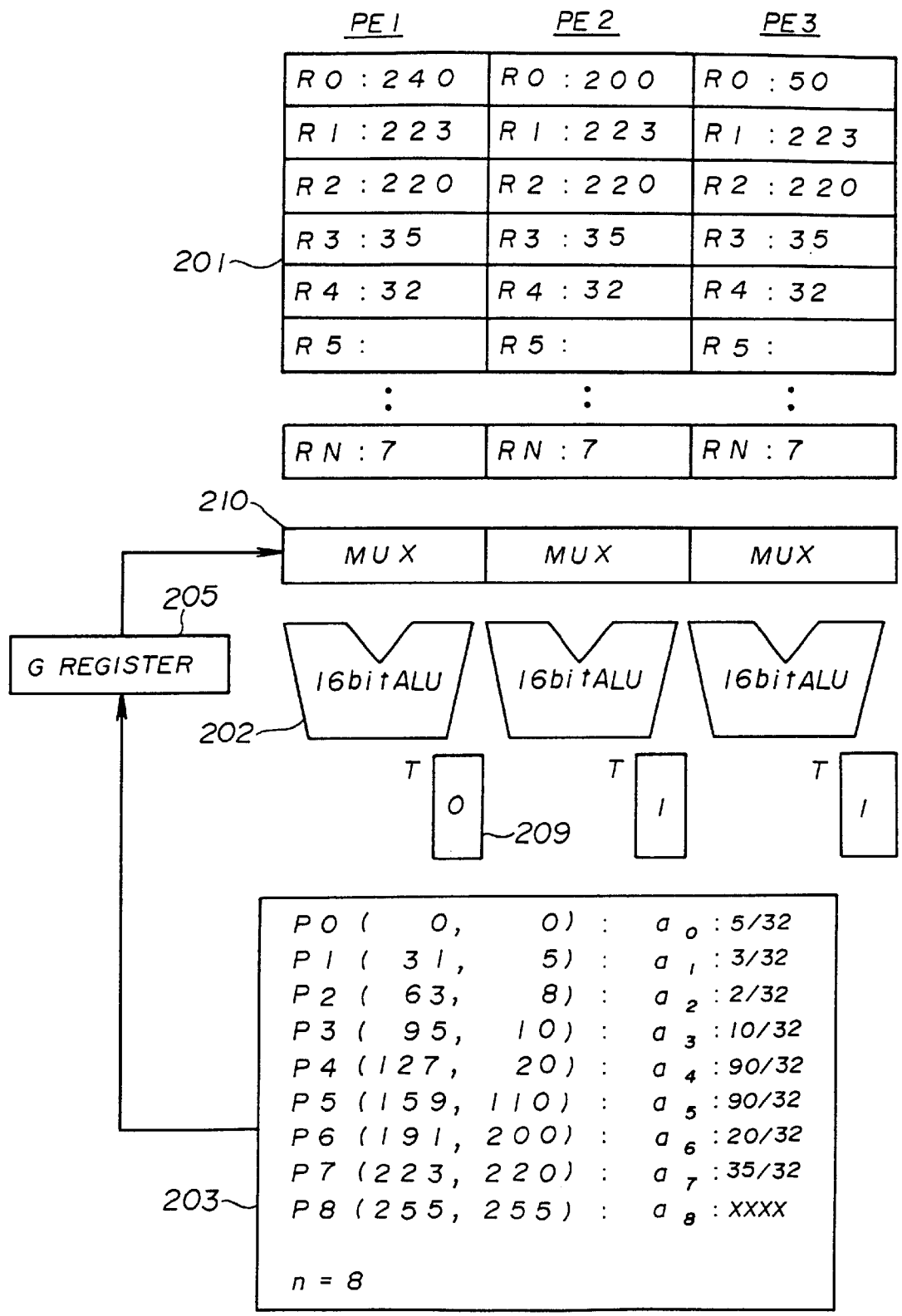
FIG. 9 is an illustrative drawing showing register conditions when a number stored in a segment register is 7 in the case of a total of 8 segments.
Figure 10:
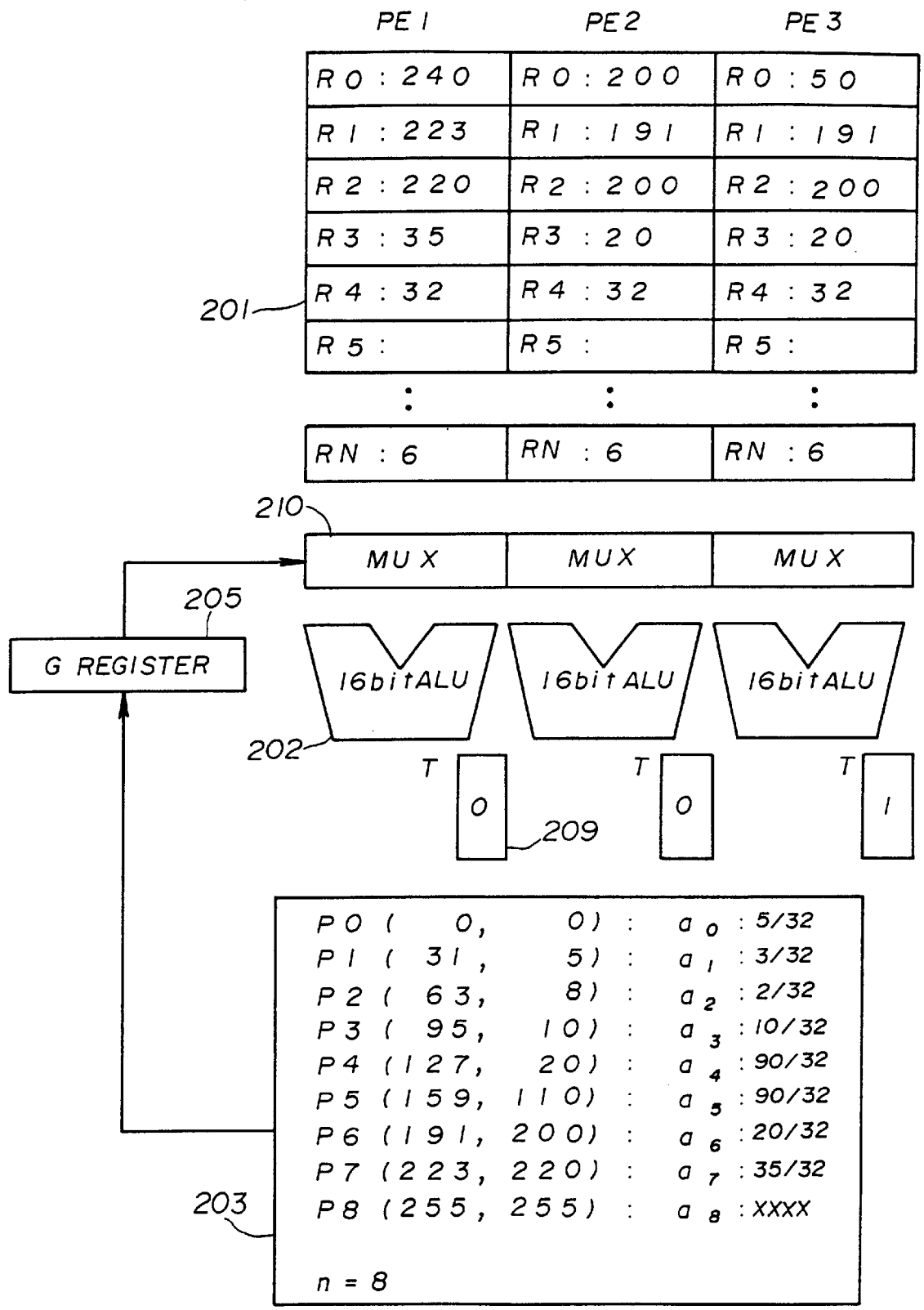
FIG. 10 is an illustrative drawing showing register conditions when the number stored in the segment register is 6.
Figure 11:
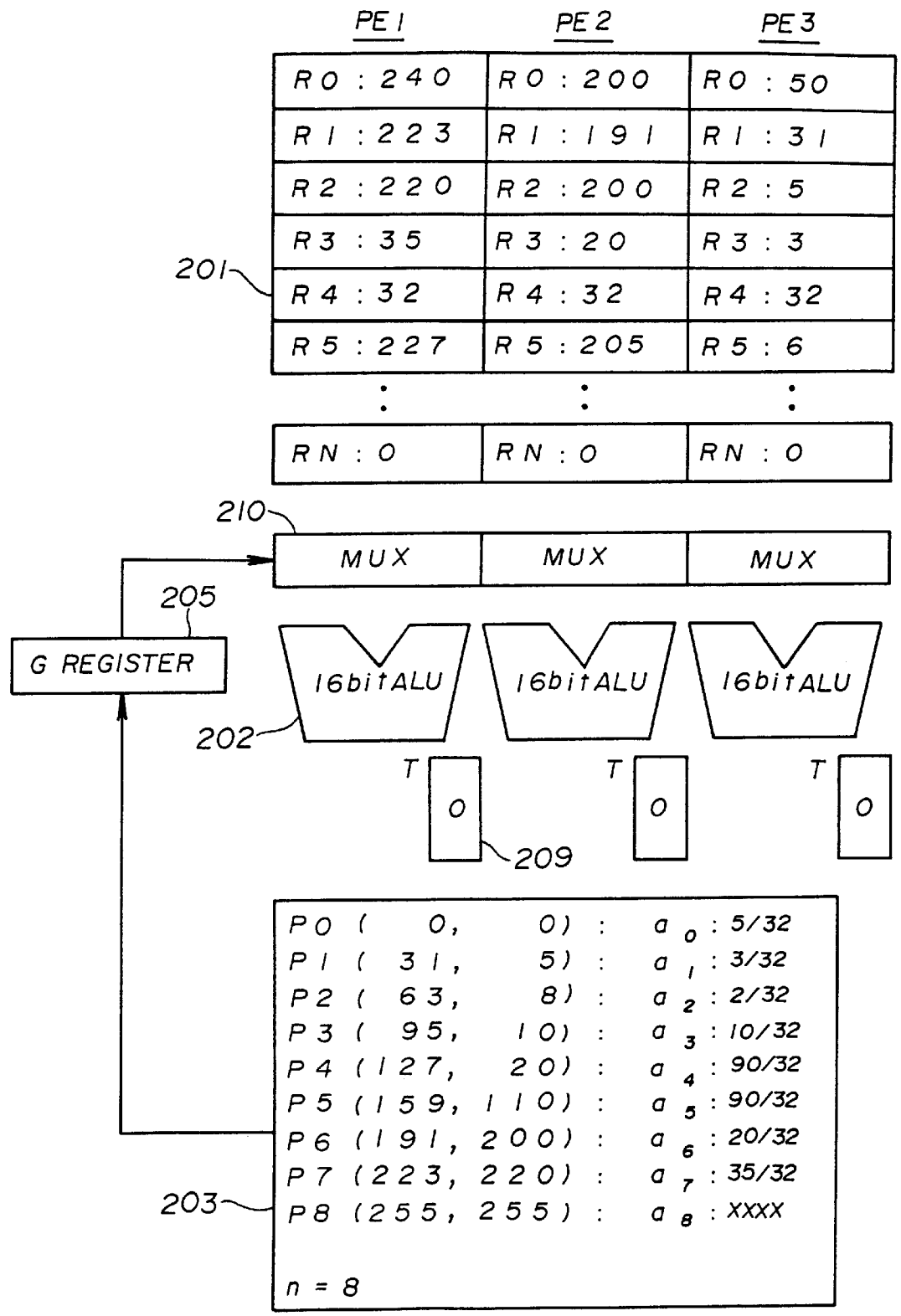
FIG. 11 is an illustrative drawing showing register conditions when the number stored in the segment register is 0.

FIG. 8 is an illustrative drawing showing initial conditions of the registers. FIG. 9 is an illustrative drawing showing register conditions when the number stored in the segment register is b 7in the case of a total of 8 segments. FIG. 10 is an illustrative drawing showing register conditions when the number stored in the segment register is 6. FIG. 11 is an illustrative drawing showing register conditions when the number stored in the segment register is 0.

As shown in the figures, input gray-scale levels of three processing elements PE1 through PE3 are 240, 200, and 50, respectively. In this example, the input gray-scale levels range from 0 to 255, and this range is divided into 8 segments of equal intervals. FIGS. 8 through 11 show the way each register is updated at every turn by the coordinate data and the slope data stored in the external data RAM 203.

It should be noted that the slope data in this example is given as a fraction which is represented by a denominator and nominator. The denominator is 32, and is to be stored in the R3 registers. The nominator is an integer, and is to be stored in the R4 registers.

As shown in FIG. 9, when the number n stored in the segment register (RN register) is 7, the x-coordinate data $x_7$ (=233) and the y-coordinate data $y_7$ (=220) are stored in the R1 and R2 registers, respectively, with respect to all the processor elements PE1 through PE3 Further, the slope data $a_7$ (=35/32) are stored in the R3 and R4 registers as a nominator and a denominator, respectively, with respect to all the processor elements PE1 through PE3. Since the current segment ranges from 223 to 255, a result of the subtraction operation is positive in the processor element PE1. The T register 209 of the processor element PE1 is thus set to 0, so that the contents of the R1 through R4 registers of the processor element PE1 are retained thereafter. On the other hand, the T registers 209 of the other processor elements PE2 and PE3 keep the value of 1 at this point of time.

As shown in FIG. 10, when the number n stored in the segment register is 6, the x-coordinate data $x_7$ (=191) and the y-coordinate data $Y_7$ (=200) are stored in the R1 and R2 registers, respectively, with respect to the processing elements PE2 and PE3. Further, the slope data $a_7$ (=20/32) are stored in the R3 and R4 registers as a nominator and a denominator, respectively, with respect to the processing elements PE2 and PE3. Since the current segment ranges from 191 to 222, a result of the subtraction operation is positive in the processor element PE2. The T register 209 of the processor element PE2 is thus set to 0, so that the contents of the R1 through R4 registers of the processor element PE2 are retained thereafter. The T register 209 of the processor element PE3 still keeps the value of 1 at this stage.

It is not until the number n becomes 1 that the processor element PE3 updates the contents of the R1 through R4 registers thereof. When the number n is 1, the R1 through R4 registers are set to 31, 5, 3, and 32, respectively, in the processing element PE3.

When the number n becomes 0, the ALUs 202 of all the processing elements PE1 through PE3 calculate int{R3/R4·(R0−R1)+R2) to obtain output gray-scale levels. The obtained output gray-scale levels are stored in the R5 registers. Register conditions at this point of time are shown in FIG. 11.

In this manner, pertinent segments are determined for all the pixels by the subtract operations of the ALUs 202, and appropriate parameters selected accordingly are used for calculating the output gray-scale levels simultaneously for all the pixels.

The above embodiment has been described with reference to an example in which gamma correction is carried out by an SIMD processor. As previously noted, the present invention is not limited to the calculation of gamma correction, but can be applied to any gray-scale-conversion scheme. For example, the present invention is applicable to a quantization process in which input gray-scale levels in a continuous scale are quantized or input gray-scale levels in a discreet scale are converted into a fewer number of output gray-scale levels. Further, the present invention is applicable to a gray-scale conversion based on a Yule-Nielsen formulae, for example.

FIG. 12 is an illustrative drawing showing an input-to-output relation of a quantization process.

As shown in FIG. 12, input gray-scale levels are converted into quantization levels Q1 through Q7 by using an input-to-output relation shown in the figure. Such a quantization process can be performed in parallel on the pixel-wise basis by using the same algorithm as described above with coordinate data and slope data of the input-to-output relation shown in the figure.

Figures 13A, 13B:
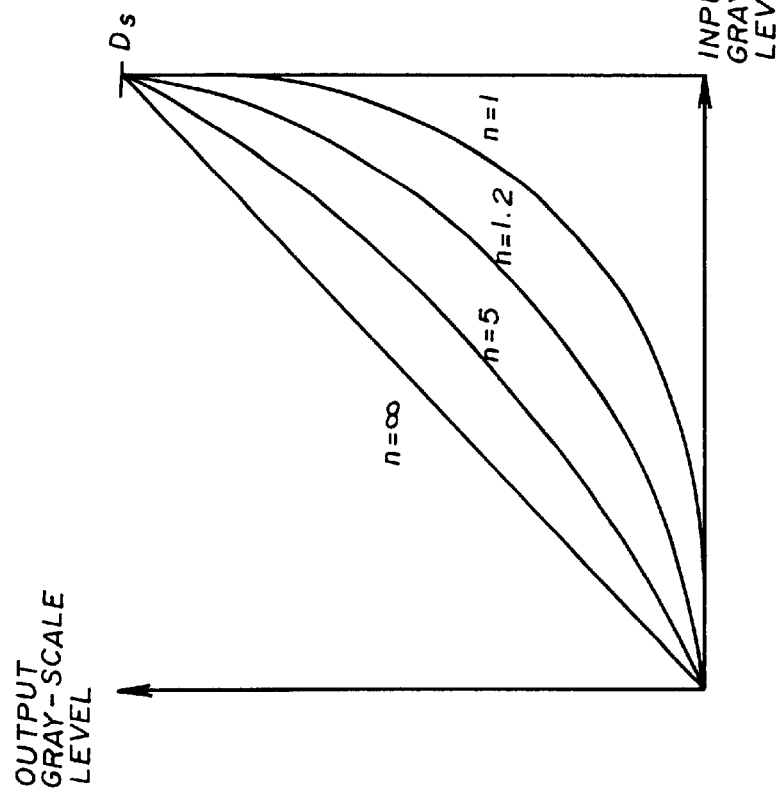
FIGS. 13A and 13B are illustrative drawings showing input-to-output relations of a Yule-Nielsen gray-scale conversion and a Yule-Nielsen formulae used for this conversion, respectively.

FIGS. 13A and 13B are illustrative drawings showing input-to-output relations of a Yule-Nielsen gray-scale conversion and a Yule-Nielsen formulae used for this conversion, respectively.

The Yule-Nielsen formulae relates an area ratio to lightness, for example, which is a measure derived from sensitivity characteristics of human vision. An area ratio A is a ratio of a black area to a total unit area, and indicates how much of a unit area is occupied by a black color area such as black dots. In the formulae, n is a Yule-Nielsen coefficient, and ODs is a maximum density.

Any one of the characteristic curves of the Yule-Nielsen gray-scale conversion as shown in FIG. 13A can be approximated for by a series of line segments. Based on coordinate data and slope data of these line segments, the Yule-Nielsen gray-scale conversion can be performed in parallel on the pixel-wise basis by using the same algorithm as described above.

Further, the present invention is not limited to these embodiments, but various variations and modifications may be made without departing from the scope of the present invention.

The present application is based on Japanese priority application No.10-071383 filed on Mar. 5, 1998, with Japanese Patent Office, the entire contents of which are hereby incorporated by reference.

What is claimed is:

1. An image processing device for performing gray-scale conversion, comprising:
   a plurality of processing elements which include respective registers, and perform the gray-scale conversion in parallel with respect to respective pixels based on data stored in the respective registers; and
   a control unit which controls said processing elements such that the registers of a given one of said processing elements store data of a line segment which is selected from a series of line segments representing an input-to-output relation of the gray-scale conversion, said line segment being selected to correspond to an input gray-scale level of a corresponding pixel.

2. The image processing device as claimed in claim 1, further comprising a program memory unit which stores programs for causing said control unit to control said processing elements.

3. The image processing device as claimed in claim 1, further comprising a memory unit which stores data of the series of line segments representing the input-to-output relation of the gray-scale conversion, wherein said control unit transfers the data of the line segment to the registers of the given one of said processing elements.

4. The image processing device as claimed in claim 3, wherein the data of the series of line segments includes a position of a start point of each of the line segments and a slope of each of the line segments, and each of said processing elements includes:
   an operation unit which performs an operation specified by said control unit; and
   a flag which stores a value indicative of a result of the operation, wherein the control unit controls said operation unit to make a comparison between the position of the start point and the input gray-scale level of a corresponding pixel successively with respect to each of the line segments so that said flag indicates whether a line segment is already selected for a corresponding one of said processing elements.

5. The image processing device as claimed in claim 1, wherein the gray-scale conversion comprises gamma correction, and the series of line segments represent a gamma curve of the gamma correction.

6. The image processing device as claimed in claim 1, further comprising:
   a scanning unit which scans a document image, and produces a scanned image signal; and
   an image-formation unit which prints the document image on a sheet of paper in accordance with a processed image signal, which is obtained by applying the gray-scale conversion to the scanned image signal.

7. A method of performing gray-scale conversion by controlling a plurality of processing elements operating in parallel with respect to respective pixels, comprising the steps of:
   a) representing an input-to-output relation of the gray-scale conversion by a series of line segments;
   b) selecting a line segment from the series of line segments with respect to each of the processing elements so that the line segment selected for a given one of the line segments corresponds to an input gray-scale level of a corresponding pixel; and
   c) controlling the processing elements in parallel to perform the gray-scale conversion, each of the processing elements operating based on data of the selected line segment.

8. The method as claimed in claim 7, wherein said step a) includes a step of storing data of each of the line segments in a memory unit, and said step b) includes a step of storing the data of the selected line segment in registers of a respective one of the processing elements.

9. The method as claimed in claim 7, wherein said step a) includes a step of storing data of each of the line segments in a memory unit, said data including a position of a start point and a slope of each of the line segments, and said step b) includes the steps of:
   successively selecting one of the line segments in an order of said series;
   making a comparison between the position of a start point of the successively selected one of the line segments and an input gray-scale level of a pixel of a given processing element; and
   storing the data of the successively selected one of the line segments in registers of the given processing element if the comparison indicates that the position of the start point of the successively selected one of the line segments is larger than the input gray-scale level of the pixel of the given processing element.

10. The method as claimed in claim 7, wherein the gray-scale conversion comprises gamma correction, and the series of line segments represent a gamma curve of the gamma correction.

11. The method as claimed in claim 7, further includes the steps of:
   scanning a document image to produce a scanned image signal; and printing the document image on a sheet of paper in accordance with a processed image signal, which is obtained by applying the gray-scale conversion to the scanned image signal.

12. A machine-readable medium having a program embodied therein for causing a processor having a plurality of processing elements operating in parallel with respect to respective pixels to perform gray-scale conversion, said program comprising:

an access-code unit configured to access data of a series of line segments representing an input-to-output relation of the gray-scale conversion;

a selection-code unit configured to select a line segment from the series of line segments with respect to each of the processing elements so that the line segment selected for a given one of the line segments corresponds to an input gray-scale level of a corresponding pixel; and a control-code unit configured to control the processing elements in parallel to perform the gray-scale conversion, each of the processing elements operating based on data of the line segment selected with respect to each of the processing elements.

13. The machine-readable medium as claimed in claim 12, wherein said access-code unit includes a unit configured to store data of each of the line segments in a memory unit, and said selection-code unit includes a unit configured to store the data of the selected line segment in registers of a respective one of the processing elements.

14. The machine-readable medium as claimed in claim 12, wherein said access-code unit includes a unit configured to store data of each of the line segments in a memory unit, said data including a position of a start point and a slope of each of the line segments, and said selection-code unit includes:

a unit configured to successively select one of the line segments in an order of said series; a unit configured to make a comparison between the position of a start point of the successively selected one of the line segments and an input gray-scale level of a pixel of a given processing element; and a unit configured to store the data of the successively selected one of the line segments in the registers of the given processing element if the comparison indicates that the position of the start point of the successively selected one of the line segments is larger than the input gray-scale level of the pixel of the given processing element.

15. The machine-readable medium as claimed in claim 12, wherein the gray-scale conversion comprises gamma correction, and the series of line segments represent a gamma curve of the gamma correction.

16. The machine-readable medium as claimed in claim 12, further comprising:

a unit configured to scan a document image to produce a scanned image signal; and a unit configured to print the document image on a sheet of paper in accordance with a processed image signal, which is obtained by applying the gray-scale conversion to the scanned image signal.

17. A device for performing gray-scale conversion based on a plurality of processing elements operating in parallel with respect to respective pixels, comprising:

means for representing an input-to-output relation of the gray-scale conversion by a series of line segments;

means for selecting a line segment from the series of line segments with respect to each of the processing elements so that the line segment selected for a given one of the line segments corresponds to an input gray-scale level of a corresponding pixel; and means for controlling the processing elements in parallel to perform the gray-scale conversion, each of the processing elements operating based on data of the line segment selected with respect to each of the processing elements.

18. The device as claimed in claim 17, wherein the gray-scale conversion comprises gamma correction, and the series of line segments represent a gamma curve of the gamma correction.

19. The device as claimed in claim 17, further comprising:

means for scanning a document image to produce a scanned image signal; and means for printing the document image on a sheet of paper in accordance with a processed image signal, which is obtained by applying the gray-scale conversion to the scanned image signal.

* * * * *